United States Patent [19]
Matsuda et al.

[11] Patent Number: 5,227,344
[45] Date of Patent: Jul. 13, 1993

[54] CERAMICS COMPOSITE ARTICLE AND METHOD FOR MAKING SAME

[75] Inventors: Toshitsugu Matsuda, Ohmama; Sinichi Saitoh, Tsuruoka; Takao Yonezawa, Ichikawa; Chorji Sakai, Funabashi; Hatsuyuki Abe, Tokyo, all of Japan

[73] Assignee: Japan Metals & Chemicals Co., Ltd., Tokyo, Japan

[21] Appl. No.: 879,739

[22] Filed: May 6, 1992

Related U.S. Application Data

[63] Continuation of Ser. No. 700,310, May 8, 1991, abandoned, which is a continuation of Ser. No. 453,963, Dec. 20, 1989, abandoned.

[30] Foreign Application Priority Data

| Dec. 28, 1988 | [JP] | Japan | 63-329427 |
| Mar. 1, 1989 | [JP] | Japan | 1-46619 |
| Apr. 28, 1989 | [JP] | Japan | 1-110378 |
| Apr. 28, 1989 | [JP] | Japan | 1-110379 |
| Apr. 28, 1989 | [JP] | Japan | 1-110380 |
| Apr. 28, 1989 | [JP] | Japan | 1-110381 |
| Apr. 28, 1989 | [JP] | Japan | 1-110382 |

[51] Int. Cl.$^5$ .................................. C04B 35/56
[52] U.S. Cl. ........................... 501/95; 264/65; 264/86; 501/92
[58] Field of Search ......... 501/95, 89, 92; 264/65, 264/86

[56] References Cited

U.S. PATENT DOCUMENTS

| Re. 32,843 | 1/1989 | Wei | 501/95 |
| 4,543,345 | 9/1985 | Wei | 501/95 |
| 4,652,413 | 3/1987 | Tiegs | 501/95 |
| 4,657,877 | 4/1987 | Becher et al. | 501/89 |
| 4,769,349 | 9/1988 | Hillig et al. | 501/95 |
| 4,789,277 | 12/1988 | Rhodes et al. | 501/89 |
| 4,840,763 | 6/1989 | Freitag | 501/95 |
| 4,882,304 | 11/1989 | Novich et al. | 264/86 |

FOREIGN PATENT DOCUMENTS

| 60-200863 | 10/1985 | Japan . | |
| 0200863 | 10/1985 | Japan | 501/95 |
| 8605480 | 9/1986 | PCT Int'l Appl. | 35/56 |

OTHER PUBLICATIONS

"Efficient Use of Whiskers in the Reinforcement of Ceramics" Milewski *Advanced Ceramic Mat'ls* vol. 1 No. 1 1986 pp. 36–41.
*Ceramic Processing* Mat'ls Advisory Bd pp. 23–29 "Solids Processing".

*Primary Examiner*—Mark L. Bell
*Assistant Examiner*—Paul Marcantoni
*Attorney, Agent, or Firm*—Oliff & Berridge

[57] ABSTRACT

Ceramic composite articles having dispersed whiskers or platelets oriented parallel to an outer surface of the articles and in two-dimensionally random directions thereof. The articles may be made by forming and sintering under a pressure of about 1 to 10 atmospheres without using hot press methods or hot isostatic pressing methods.

6 Claims, 7 Drawing Sheets

CERAMICS COMPOSITE ARTICLE AND METHOD FOR MAKING SAME

This is a continuation of application Ser. No. 07/700,310 filed May 8, 1991, now abandoned, which in turn is a continuation of U.S. Ser. No. 07/453,963, filed Dec. 20, 1989, now abandoned.

BACKGROUND OF THE INVENTION

The present invention relates to ceramics obtained by compositing whiskers or platelets, and forming and sintering them under normal pressure, as well as to a method for making thereof, and a cylinder liner for automobile engine, a pipe coupling, a stoke, a heater tube and a pot used for ball milling, particularly to high strength and high toughness ceramics formed and sintered under normal pressure, as well as to a method for making thereof.

A technical development in ceramics has made it possible to use ceramics in conventionally unthinkable applications such as automobile engine parts, bearings and cutting tools.

However, ceramics have essentially a property "brittle", which is a cause of throttling the extension of their applications.

Japan Laid-Open Publication Nos. 58/104069 and 62/265173 relate to ceramics compositing short fibers produced by hot press method or HIP-method.

But hot press method or HIP-method requires large scale facilities, is expensive, and has a problem that it is difficult to produce articles of complicated shapes such as tubular objects.

The present invention has a purpose of providing a ceramics article of high strength and superior toughness.

The present invention also discloses a method for making a ceramics article by forming and sintering this ceramics article of high strength and superior toughness under normal pressure without using hot press method or HIP-method. Forming and sintering under normal pressure makes it possible to produce ceramics of high strength, superior toughness and complicated shapes cheaply, which will result in further more extended applications of ceramics.

DESCRIPTION OF THE PREFERRED EMBODIMENTS

To begin with, a ceramics composite article according to the present invention is described. The present invention relates to a ceramics composite article wherein whiskers are dispersed in the matrix. The fibers of silicon carbide are very strong with their tensile strength of about 300 kg/mm$^2$. The aluminaceous fibers and carbon fibers are also very strong. In the strict sense of the word a whisker means a needle-like single crystal, but since also polycrystalline silicon carbide short fibers, aluminaceous short fibers and carbon short fibers are often called whiskers, "whisker" is a general term for the above mentioned short fibers in this specification.

According to the present invention, silicon carbide short fibers of ca. 0.1 ~ 1 μm in diameter and 5 ~ 100 μm in length are used as whiskers. An article on the market (for example "TOKAWHISKER"-tradename-made by TOKAI CARBON CO., LTD.) is available for these whiskers, or silicon carbide long fibers on the market (for example NIKARON-tradename-made by NIHON CARBON CO., LTD.) can be used by cutting them and making all of uniform length for example by mean of sedimentation. Whiskers of under 5 μm in length improve the toughness of ceramics articles only a little because of their low aspect ratio. Whiskers of over 100 μm in length become tangled easily and thereby form inhomogeneous network structures in a green body described later. The amount of whiskers is preferably 5 ~ 30% by volume. An amount of under 5% by volume improves the toughness of ceramics articles only a little, and in an amount of over 30% by volume whiskers become tangled easily and thereby form inhomogeneous network structures in a green body, which makes it difficult to produce dense ceramics composite articles having for example a relative density of 90% and above.

Figure 1A:
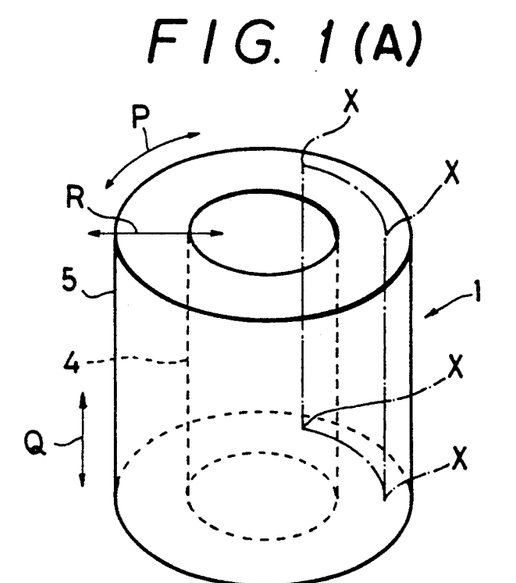
FIGS. 1(A), (B) and (C) are illustrations of a ceramics article according to the present invention and dispersed conditions of whiskers therein.
Figure 1B:
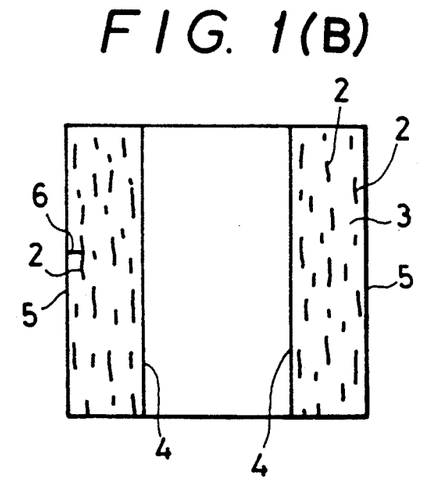
Figure 1C:
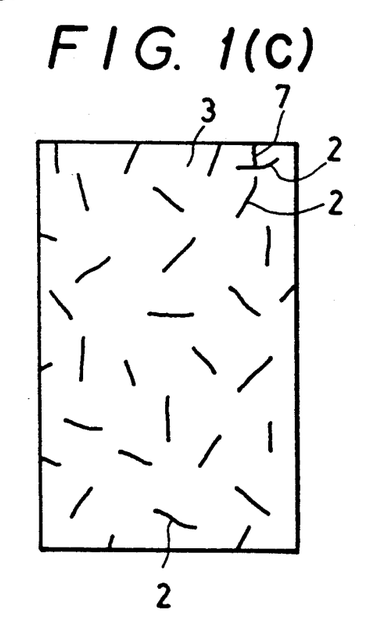

In a ceramics composite article according to the present invention, dispersed whiskers are oriented parallel to the outer surface of the ceramics article and also in two-dimensionally random directions over the whole thickness from the outer surface to the inner surface of the ceramics article. The ceramics composite articles according to the present invention are used as structural parts having the shapes of pipes, containers, plates, etc. of 20 mm and below in thickness. FIG. 1 is an illustration of dispersed whiskers in a ceramics composite article according to the present invention which comprises a pipe, wherein (A) is a general view, (B) is a vertical cross-sectional view and (C) is an enlarged development view taken along the plane X—X of (A). In a ceramics composite article 1 according to the present invention, dispersed whiskers 2 are, as shown in FIG. 1(B), oriented schematically parallel to the outer surface 5 of the ceramics article over the whole thickness from the outer surface 5 to the inner surface 4 of the ceramics article in FIG. 1(A). Over 80% of whiskers are, for example, oriented in an inclined angle of 30° and below, more preferably 15°, to the outer surface 5. Whiskers 2 are, as shown in FIG. 1(C), oriented in two dimensionally random directions in the plane parallel to the outer surface 5 such as in the X—X plane of FIG. 1(A).

As mentioned above, the ceramics composite articles are used as structural parts. For example, ceramics pipes used as structural parts are often damaged because of tensil stress in the directions of the arrows P and Q as well as in the composed direction of P and Q, however, they are seldom damaged because of tensile stress in the direction of thickness shown by the arrow R. When hot gas is passed through the pipe for example in FIG. 1(A), the inner surface 4 of the pipe is heated and expanded thermally, and tensile stress is applied to the outer surface 5 of the pipe in the direction of P and Q, however, according to the present invention the tensile stress applied to the matrix 3 is reduced because of the tensile stress resistance of the high strength whiskers, which results in the prevention of cracks. Even if micro-cracks 6 or 7 are produced in the matrix 3 in FIG. 1(B) or (C), these cracks 6 or 7 stop growing when they reach the whiskers 2. The whiskers oriented parallel to the outer surface of a ceramics articles and in two-dimensionally random directions protect the matrix most effectively from the tensile stress applied to the surface of a ceramics article. The ceramics composite articles according to the present invention having superior toughness, because all of the dispersed whiskers are oriented parallel to the outer surface of the ceramics article and in two-dimensionally random directions over the whole thickness from the outer surface to the inner surface of the ceramics article.

The present invention also relates to ceramics composite articles of high strength and superior toughness whose relative density is 90% and above and in which the crack growth are prevented. Whiskers-ceramics composite articles have generally a low density if no special means are taken at the time of their production, which impairs their strength and toughness easily, because of many defects contained therein. As described later, ceramics composite articles according to the present invention have a high strength and a superior toughness because they are produced by a method by which a high relative density can be obtained and defects can be decreased.

In the following, a method for producing ceramics composite article according to the present invention is described. In the present invention, a slip with a viscosity of 3.0 poise and below is made by dispersive whiskers and ceramics powder in a dispersion medium, this slip is poured in a porous mould, and a green body with a relative density of 60% and above is formed under normal pressure. In the present invention, the viscosity is measured by a rotary viscometer which was calibrated with a standard liquid for calibrating viscometers according to JIS Z 8809. In the present invention, if the mould is vibrated when a slip is poured into the mould or immediately thereafter, more preferable results can be obtained.

Figure 2:
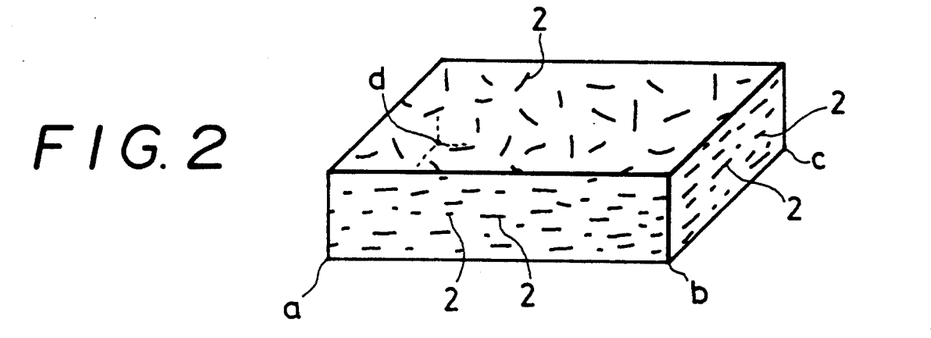
FIG. 2 is a scheme illustrating the orientation of whiskers in a green body formed from a slip with a viscosity of 3 poise and below according to the present invention.

A slip with a viscosity of 3.0 poise and below is made for example by adding water to a mixture comprising 10 parts by weight of silicon carbide whiskers with a diameter of ca. 0.5 μm and a length of ca. 30 μm, 75 parts by weight of silicon nitride powder with a granular size of ca. 1.0 μm and 15 parts by weight of a cordierite-group-sintering aid, and stirring the mixture sufficiently. This slip is poured into a gypsum mould of 5 cm wide, 5 cm long and 4 cm deep (in this example a gypsum mould having a bottom made of gypsum and side walls made of polyvinyl chloride was used), and is attached 10 mm thick. Thereafter the rest of the slip is removed and drying is performed for 24 hours, thereby obtaining a plate-like green body with a density of ca. 65%. FIG. 2 is a scheme showing the orientation of the whiskers in the green body casted from the slip with a viscosity of 3.0 poise and below according to the present invention. In FIG. 2 dispersed whiskers 2 of silicon carbide are oriented schematically parallel to the outer surface of the green body (the bottom of the gypsum mould) a, b, c, d and two-dimensionally uniformly at random over the whole thickness of the green body. In the present invention, a ceramics composite article is obtained by sintering this green body for example to 1700° C. for 3 hours under normal pressure (1~10 atm).

At the time of sintering the whiskers of silicon carbide do not change their orientation. Accordingly, the ceramics composite article produced by sintering the green body in FIG. 1 becomes a ceramics composite article whose whiskers are dispersed in the matrix schematically parallel to the outer surface of the ceramics and two-dimensionally at random over the whole thickness of from the outer surface to the inner surface of the ceramics article.

This ceramics composite article using a green body with a relative density of 60% and above moulded from a slip with a viscosity of 3.0 poise and below is dense with its relative density of 90% and above, has a superior toughness, shows a uniform shrinkage factor in its thickness direction at the sintering, and is a ceramics composite containing no macro-defects such as macropore and whiskers agglomerate.

Figure 3:
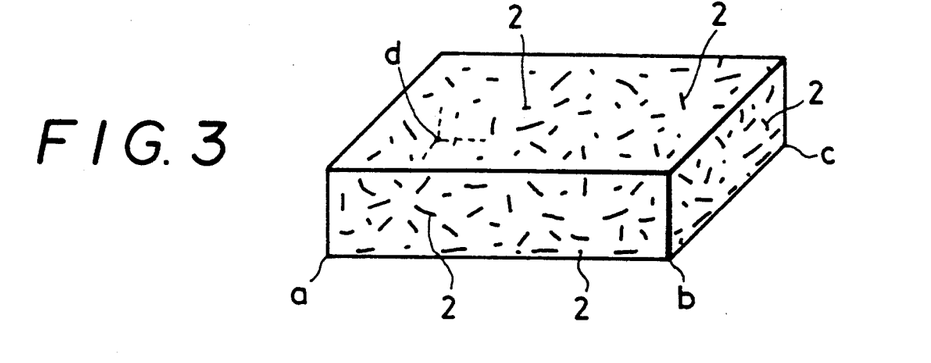
FIG. 3 shows a comparative example and is a scheme illustrating the orientation of whiskers in a green body formed from a slip with a viscosity of ca. 10 poise.

The present inventor et al. tried to produce whiskers-ceramics composited using several slip with different viscosities. For example, a slip with a viscosity of ca. 10.0 poise was made by adding CMC (a binder which improves the strength of a green body) a little to the same slip as in FIG. 2 and mixing them sufficiently. Using this slip a green body was moulded under the same conditions as in FIG. 2. The obtained green body had a relative density of ca. 50%. FIG. 3 is a scheme showing the orientation of the whiskers of a green body using a slip with a viscosity of ca. 10 poise. As shown in FIG. 3, dispersed whiskers 2 are oriented three-dimensionally at random. Since the whiskers oriented as shown in FIG. 3 become tangled with each other and the slip is filled insufficiently, the relative density of the green body is low, and therefore the relative density of the sintered composite is also low, so that no high strength ceramics composite can be obtained. And a slip with a viscosity of ca. 5.0 poise was made for example by adding a regulated amount of CMC to the same slip as in FIG. 2 and mixing them sufficiently. Using this slip a green body was moulded under the same conditions as in FIG. 2. The obtained green body had a relative density of ca. 62%.

Figure 4:
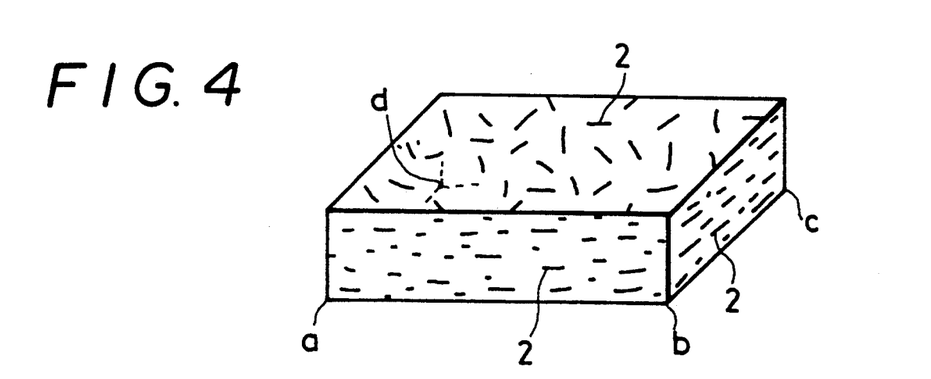
FIG. 4 shows a comparative example and is a scheme illustrating the orientation of whiskers in a green body formed from a slip with a viscosity of ca. 5 poise.

FIG. 4 is a scheme showing the orientation of the whiskers of a green body using a slip with a viscosity of ca. 5.0 poise. As shown in FIG. 4, dispersed whiskers 2 are oriented at first sight, schematically same as in FIG. 2, schematically parallel to the outer surface of the green body (the bottom of the gypsum mould) of a, b, c, d and two-dimensionally at random. This green body made from a slip with a viscosity of ca. 5.0 poise was sintered at 1700° C. for 3 hours, thereby obtaining a ceramics composite. At first sight the orientation of the whiskers in this ceramics composite was similar to that of the green body in FIG. 2 using a slip with a viscosity of 3.0 poise and below. However, this green body made from a slip with a viscosity of 5.0 poise showed a largely scattering shrinkage factor in the thickness direction at the sintering, and many defects were observed in the ceramics composite after sintering.

In the foregoing the method according to the present invention was described with respect to green bodies and sintered ceramics composited with whiskers of silicon carbide, however, according to the knowledges of the present inventor et al. the same phenomena are observed even if other materials are used as whiskers or matrix. That is, when using a slip with a viscosity of 10 poise and above, no high strength ceramics can be obtained by compositing with whiskers because of a low relative density of a green body or a sintered ceramics, when using a slip with a viscosity of ca. 5 poise, a ceramics can be obtained which has a high relative density and whose whiskers are oriented schematically parallel to the outer surface of a sintered ceramics article and two-dimensionally at random. But this ceramics composite article shows no superior strength or toughness because it contains many defects.

The reason why many defects are contained in the ceramics composite when using a slip with a viscosity of ca. 5 poise is considered as follows: When using a slip with a viscosity of ca. 5 poise, the orientation of whiskers in the green body seems to be similar to that in FIG. 2 at first sight, but the whiskers are dispersed still insufficiently uniformly. The whiskers form network structures in a green body, however, using a slip with a viscosity of ca. 5 poise the network structures are not formed uniformly. If a green body having not uniformly formed network structures is sintered, shrinkage factors are different between dense formed and coarse formed network structures, and defects are caused by this difference.

In the present invention a slip with a viscosity of 3 poise and below is used. When using a slip with a viscosity of 3 poise and below, the green body shrinks uniformly in the thickness direction at the sintering, and defects are hard to be produced in a sintered ceramics article. This is probably because network structures of the whiskers, when using a slip with a viscosity of 3 poise and below, are formed more uniformly than those at a viscosity of 5 poise, and because the shrinkage factor in the thickness direction at the sintering becomes more uniform.

Secondly the present invention is characterized by a ceramics composite article in whose matrix platelets are dispersed.

As a platelet, for example, platelets of hexagonal silicon carbide with a thickness of ca. 0.5~5 μm and a diameter of 20~70 μm is commercially available (Trade name: Silicon Carbide Platelet, made by AMERICAN MATRIX CO., LTD.). This platelet has a very high strength and can be used in the present invention.

And for example, since hexagonal boron nitride has similar crystals structure to those of graphite, the powder thereof essentially comprises platelets, and boron nitride powders of various particle sizes are commercially available and they can be also used as platelets according to the present invention.

As a matrix material, for example, silicon nitride powder with a mean particle diameter of ca. 1 μm (Trade name: SNP-8S, made by JAPAN METALS & CHEMICALS CO., LTD.) is commercially available and can be used as a matrix material for the ceramics article according to the present invention.

In a ceramics according to the present invention, the plate surfaces of the dispersed platelets oriented in the same direction as the outer surfaces of the ceramics article, that is, parallel thereto, and have a relative density of 85% and above after sintering.

Figure 6A:
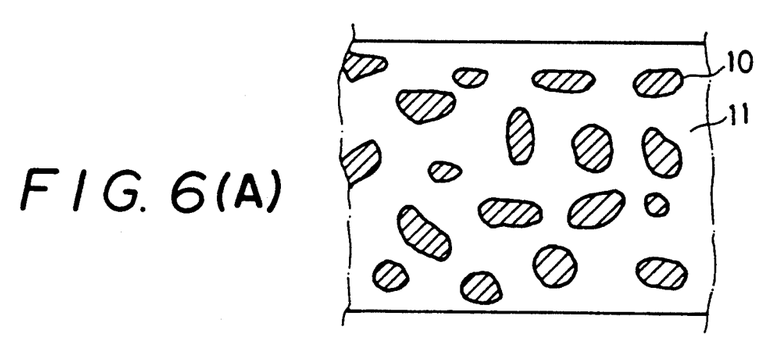
FIGS. 6(A), (B) and (C) are illustrations of the orientation of the platelet in a ceramics article according to the present invention.
Figure 6B:
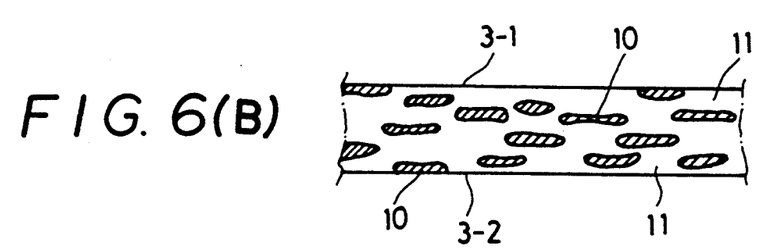
Figure 6C:
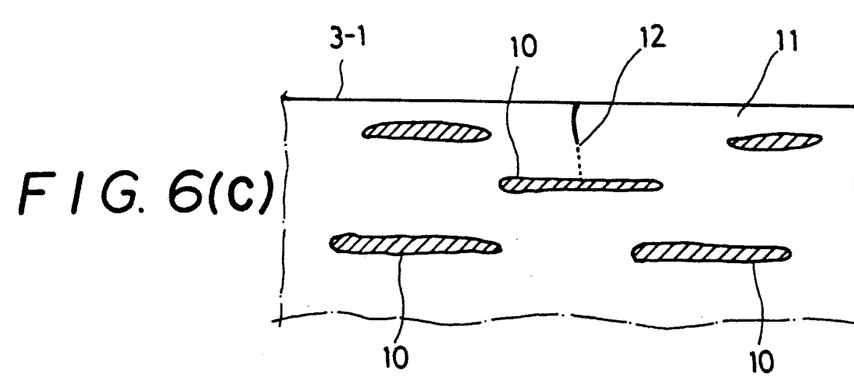

FIGS. 6(A), (B) and (C) are descriptive views of the orientation of the platelet in a ceramics article according to the present invention. (A) shows the outer surfaces of a ceramics article, and (B) is a longitudinal sectional view. In a ceramics according to the present invention, the platelets 10 are dispersed in the matrix, with the plate surfaces thereof being oriented parallel to the outer surfaces (3-1, 3-2) of the ceramics. This orientation of the platelets are maintained over the whole thickness from the surface (3-1) to the under surface (3-2) of the ceramics. FIG. 6(C) is a enlarged view of FIG. 6(B) and shows the effects of the platelets. In FIG. 6(B), for example, when the under surface 3-2 expands thermally upon being heated rapidly, tensile stress is applied to the surface of the ceramics 3-1, however, the high strength platelets 10 withstanding this stress, reduce the tensile strength applied to the matrix 11, thereby preventing defects such as cracks. As shown in FIG. 6(C), even if micro-cracks 12 are produced in the matrix 11, the platelets 10 prevent further crack growth when the micro-cracks 12 reach the platelets 10, thereby protecting the matrix from cracks. Thus the platelets improve the thermal shock resistance of the ceramics remarkably. The platelets whose plate surfaces are oriented in the same direction as the outer surfaces 3-1 and 3-2, that is, parallel thereto, protect the matrix most effectively from the tensile stress applied to the surfaces of the ceramics. A ceramics composite article according to the present invention exhibits an excellent thermal shock resistance because the plate surfaces of all the dispersed platelets are oriented in the same direction as the outer surfaces of the ceramics article.

In the present invention the relative density of the sintered ceramics shall be 85% and above. According to the knowledge of the present inventor et al., a ceramics composite article with a relative density of below 85% exhibits low bending strength and low toughness, but by improving the relative density to 85% and above, satisfactory properties can be obtained.

In the following, a method for making a ceramics article reinforced with the platelets is described.

In the first process according to the present invention, for example, a desired amount of 30% by volume and below of said platelets is mixed with said ceramics powder, and this mixture and a sintering aid are added to a dispersive medium, thereby obtaining a slip with a viscosity of 5 poise and below.

In the present invention, the viscosity of the slip means a viscosity measured with a rotation viscometer calibrated with the standard liquid for viscosity calibration of JIS Z 8809. The platelets may be mixed in an amount of 30% by volume and above, but since the bending strength of the sintered ceramics would be reduced thereby, an amount of 30% by volume and below is preferable. As a sintering aid, for example, alumina, yttria, etc. can be used.

As a dispersive medium, water or a nonaqueous solvent such as alcohol can be used. In the present invention the viscosity of the slip shall be 5 poise and below, of which reason is described as follows: In the second process of the present invention, the slip made in the first process is poured in a hygroscopic, for example, gypsum mould and held therein, a build-up layer is formed, and the rest of the slip is removed. The present inventor et al. performed the second process using slips of various viscosity in order to obtain build-up layers with a thickness of 10~30 mm. For a slip with a viscosity of above 5 poise, only a part of the platelets includes plate surfaces oriented parallel to the outer surfaces of the ceramics article, but the most platelets have plate surfaces oriented three-dimensionally at random.

Figure 7:
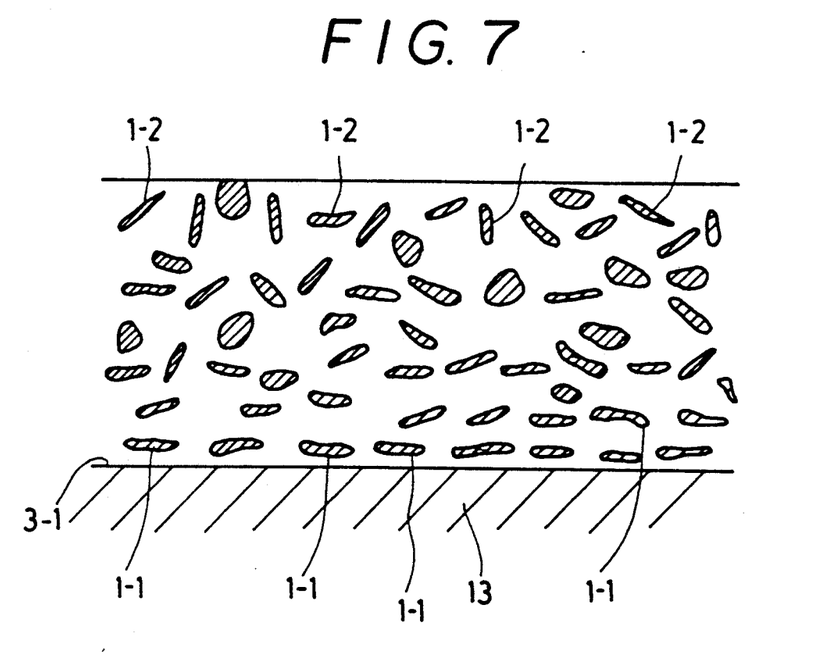
FIG. 7 is an illustration of the orientation of the platelet when using a slip with a viscosity of above 5 poise.

FIG. 7 shows the orientation of the platelets when using a slip with a viscosity of above 5 poise. The platelets near the gypsum mould 13, for example 1—1, include plate surfaces oriented parallel to the outer surfaces (gypsum mould and wall surface) 3-1 of the ceramics article, but the platelets of the build-up part away from the gypsum mould 13, for example 1-2, include plate surfaces oriented three-dimensionally at random.

According to the present invention, as described before, the orientation of the plate surfaces of the platelets is regulated over the whole thickness from the surface to the under surface of the ceramics. For this purpose a slip with a viscosity of 5 poise and below is used according to the present invention. A slip with a viscosity of 5 poise and below can be attained for example by the regulation of the added amount of a dispersive medium, the regulation of pH and by the use of a dispersive medium.

In the third process of the present invention, a green body is obtained by removing the build-up layer from the mould, and the green body shall have a relative density of 55%. If the green body has a relative density of below 55%, it is difficult to maintain the relative density of the ceramics after sintering at 85% and above stably.

A green body with a relative density of 55% and above can be attained for example by the particle size distribution of silicon nitride for matrix and by the added amount of a dispersive medium.

By sintering this green body in a non-oxidizing atmosphere under a gass pressure of 10 kg/cm$^2$ for example at 1600°~1750° C., a ceramics article is obtained whose dispersed platelets include plate surfaces oriented parallel to the outer surfaces of the ceramics article and for example in a direction of 30° and below to the outer surfaces of the ceramics article, and which has a relative density of 85% and above, and are also excellent in strength as well as in thermal shock resistance.

EXAMPLE 1

In Table 1 No. 1-1 and No. 1-2 are silicon nitride matrix/silicon carbide whisker composite articles according to the present invention, wherein, corresponding to FIG. 2, the green body made from a slip with a viscosity of 3.0 poise and below. These ceramics articles show a high bending strength and a superior toughness.

In Table 1 No. 2-1 and No. 2-2 are ceramics composite articles of the comparative examples, wherein, corresponding to FIG. 3, a slip with a viscosity of ca. 10.0 poise is used. The whiskers are oriented three-dimensionally at random, have a low relative density, and show insufficient bending strength and toughness.

In Table 1 No. 3-1 and No. 3-2 are ceramics composite articles of the comparative examples, wherein, corresponding to FIG. 4, a slip with a viscosity of ca. 5.0 poise is used. At first sight the whiskers of these ceramics are oriented schematically parallel to the outer surface of the ceramics article and two-dimensionally at random as in No. 1-1 and No. 1-2, however, because these ceramics composite articles show largely scattering shrinkage factors in the thickness direction, the shapes of their articles are distorted and have only insufficient bending strength and toughness, so that the articles no ceramics composite articles of high-strength and superior toughness can be obtained.

TABLE 1

| No. | Viscosity of slip (poise) | Relative density of green body (%) | Sintering temp. (°C.) | Shrinkage factor in thickness direction (%) *1 | Ceramincs composite article ||||
|---|---|---|---|---|---|---|---|---|
| | | | | | Orientation of whiskers *2 | Macro defects | Relative density (%) | Bending strength kgf/mm$^2$ | Fracture toughness value MPam$^{\frac{1}{2}}$ |
| 1-1 | 1.5 | 65 | 1650 | 14.8~15.2 | Type A | None | 95.1 | 85.3 | 6.5 |
| 1-2 | 1.5 | 65 | 1750 | 16.5~16.7 | Type A | None | 98.6 | 90.0 | 6.8 |
| 2-1 | 10.0 | 50 | 1650 | 16.4~17.8 | Type B | Yes | 87.3 | 57.6 | 5.2 |
| 2-2 | 10.0 | 50 | 1750 | 16.8~18.7 | Type B | Yes | 88.4 | 62.1 | 5.3 |
| 3-1 | 5.0 | 62 | 1650 | 13.9~15.0 | Type A | Yes | 95.2 | 76.0 | 5.0 |
| 3-2 | 5.0 | 62 | 1750 | 16.0~17.1 | Type A | Yes | 97.8 | 79.2 | 5.7 |

*1: [{Green body thickness) - (Ceramics composite thickness)}/{Green body thickness}] × 100, Max.~Min.
*2: Type A ... Orientation in FIG. 2, Type B ... Orientation in FIG. 3

EXAMPLE 2

Silicon nitride powder, SiC whisker and a sintering aid were mixed in the weight ratio of 75:10:15, and then the mixture was put into an alumina pot, water and a dispersing agent were added thereto, and the resulting mixture was mixed and dispersed for 46 hours. The viscosity of this slip according to the present invention was 0.4 poise.

As a comparative example, silicon nitride powder and a sintering aid were mixed in the weight ratio of 85:15, and a slip of the comparative example was produced in the same way. The viscosity of the slip of the comparative example was 0.6 poise.

Figure 5:
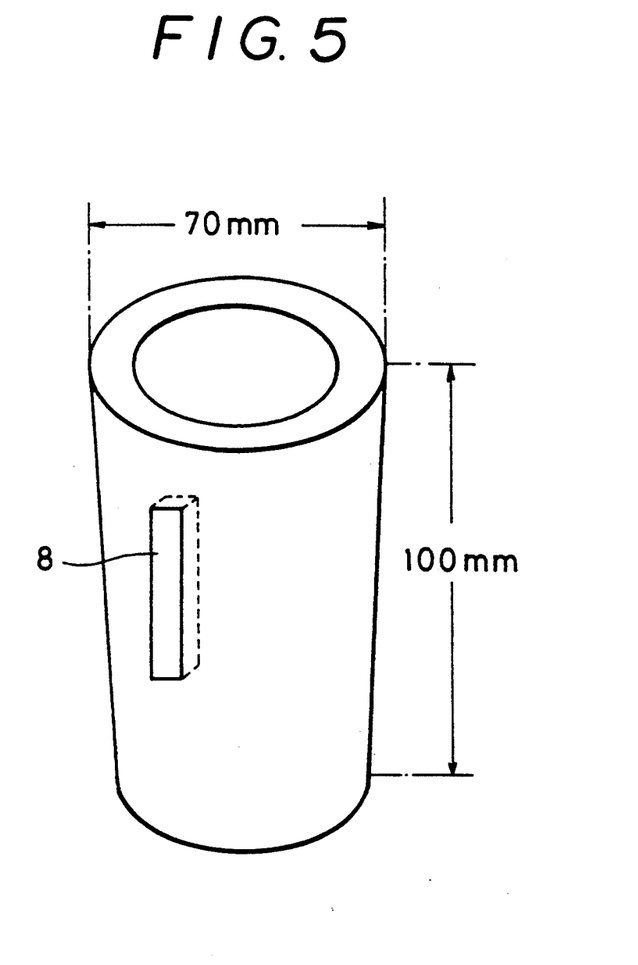
FIG. 5 is an illustration of the shape of the crucibles used in Example 2.

Each of slips of the present invention and the comparative example was poured respectively into a crucible-forming gypsum mould of 70 mm in diameter and 100 mm in height having a shape shown in FIG. 5, and was solidified about 7 mm thick to the mould surface. Thereafter an unsolidified slip was removed. The relative density of the moulded crucible-like green body was 62.8% in the present invention, and was 65.5% in the comparative example. These green bodies were sintered in a nitrogen atmosphere of 1 atm. at 1700° C. for 3 hours. Both of the crucibles could be sintered without getting out of shape. In the crucible containing no SiC whisker the shrinkage factor in the height direction was almost same as that in the thickness direction, but the crucible containing 10% of SiC showed 1.6 times more shrinkage in the thickness direction than in the height direction.

A test piece 8 of 3×4×40 mm was cut out from the side wall of each crucible, polished and observed on its structures under the optical microscope. In the test piece cut out from the crucible containing SiC whisker it could be confirmed that the whiskers are oriented parallel to the wall surface. Subsequently, a heat impact test was performed on each test piece. This test comprises dropping a test piece held at a constant temperature into cold water (20° C.), quenching it, measuring its strength by a three-point bending test and obtaining a critical thermal shock temperature difference ($\Delta Tc$).

Table 2 is a slip with a lower viscosity made by adding water to No. 4 slip. These slips were poured in the gypsum moulds, thereby obtaining disk-like green bodies of 60 mm in diameter×6 mm. Sintered bodies were made by sintering these green bodies at 1700° C. for 3 hours in a nitrogen atmosphere.

The relative density, three-point bending strength (JIS-method) and fracture toughness value (SEPB-method) were measured. The orientation of the SiC platelets was also observed under the optical microscope. The results thereof are shown in Table 2. The three-point bending strength and fracture toughness value in Table 2 were measured in the direction in which the surfaces parallel to the water-absorbing sides of the gypsum mould are taken as a pressure applying surface.

As shown in Table 2, No. 1, No. 2 and No. 3 with a platelets orientation of A and with a relative density of 85% and above, are ceramics articles having an excellent bending strength and an excellent fracture toughness value.

TABLE 2

| | | | Ceramics articles after sintering | | | | |
|---|---|---|---|---|---|---|---|
| No. | Viscosity of slip (poise) | Relative density of green body (%) | Orientation of whiskers *1 | Relative density (%) | Bending strength (kg.mm$^2$) | Fracture toughness value (MPam$^{\frac{1}{2}}$) | Thermal shock resistance temp. difference (°C.) |
| 1 | 0.5 | 66 | A | 97.6 | 63.7 | 7.5 | 900 |
| 2 | 1.0 | 65 | A | 95.4 | 64.1 | 7.1 | 900 |
| 3 | 4.0 | 61 | A | 93.2 | 60.5 | 7.2 | 850 |
| 4 | 10.0 | 58 | B | 89.5 | 58.7 | 5.6 | 650 |
| 5 | 2.5 | 53 | A | 83.8 | 50.0 | 5.3 | 600 |

*1 A: Platelets are oriented as shown in FIG. 1.
B: Platelets are oriented as shown in FIG. 2

According to the results of this heat impact test, the crucible containing 10% of SiC whisker can tolerate a quenching temperature difference of 950° C., and the crucible containing no SiC whisker a difference of 800° C. In the test piece containing no whiskers cracks appeared in a direction passing through the wall of the crucible, however, in the test piece containing whiskers cracks grew in a direction like a peeling, which showed that the cracks are hard to grow to a fatal rupture.

EXAMPLE 3

Silicon nitride powder with an average particle size of 1.0 μm, SiC platelets (made by American Matrix Co., Ltd.) with an average plane diameter (average diameter of the plate surfaces of the platelets) of 25 μm and with an average thickness of 1 μm, and a cordierite-group sintering aid were prepared in a ratio of 77:10:13, water was added thereto and the preparation was mixed sufficiently, thereby obtaining a slip. By adding various regulated amounts of CMC (a bonding agent improving the strength of a green body and not taking part in sintering) to the slip, the slips with different viscosities shown in No. 1~No. 4 of Table 2 were made. No. 5 of

EXAMPLE 4

Silicon nitride powder with an average particle size of 1.0 μm, BN platelets (UHPS1 made by Showa Denko Co., Ltd.) with an average plane diameter of 1.5 μm and with an average thickness of 0.4 μm, and a cordierite-group sintering aid were prepared in a ratio of 75:10:15, and water was added thereto, thereby obtaining a slip. No. 10 of Table 3 was obtained by drying the slip, grinding to 60 mesh and below, and by forming to a disk of 60 mm in diameter×6 mm by means of pressing of 1 ton/cm$^2$. For No. 6~No. 9 of Table 3, the viscosities thereof were regulated in the same way as in Example 1, and disk-like green bodies of 60 mm in diameter×6 mm were made by pouring in the gypsum moulds. These green bodies were sintered at 1700° C. for 5 hours in a nitrogen atmosphere. The relative density, three-point bending strength and thermal shock resistance temperature difference of the sintered bodies were measured, and the results thereof are shown in Table 3.

As shown in Table 3, No. 6, No. 7 and No. 8 according to the present invention are excellent in bending strength and thermal shock resistance.

TABLE 3

| | | | Ceramics articles after sintering | | | |
|---|---|---|---|---|---|---|
| No. | Viscosity of slip (poise) | Relative density of green body (%) | Orientation of whiskers *2 | Relative density (%) | Three-point bending strength (kg/mm$^2$) | Thermal shock resistance temp. difference (°C.) |
| 6 | 0.3 | 58 | A | 87.0 | 58 | 1000 |
| 7 | 1.0 | 56 | A | 85.6 | 51 | 1000 |
| 8 | 3.0 | 55 | A | 85.1 | 48 | 950 |
| 9 | 8.5 | 52 | B | 81.1 | 35 | 700 |

TABLE 3-continued

| No. | Viscosity of slip (poise) | Relative density of green body (%) | Ceramics articles after sintering | | | |
|---|---|---|---|---|---|---|
| | | | Orientation of whiskers *2 | Relative density (%) | Three-point bending strength (kg/mm²) | Thermal shock resistance temp. difference (°C.) |
| 10 | Pressing | 51 | B | 77.8 | 33 | 650 |

*2 A: Platelets are oriented as shown in FIG. 1.
B: Platelets are oriented as shown in FIG. 2

EXAMPLE 5

Figure 8:
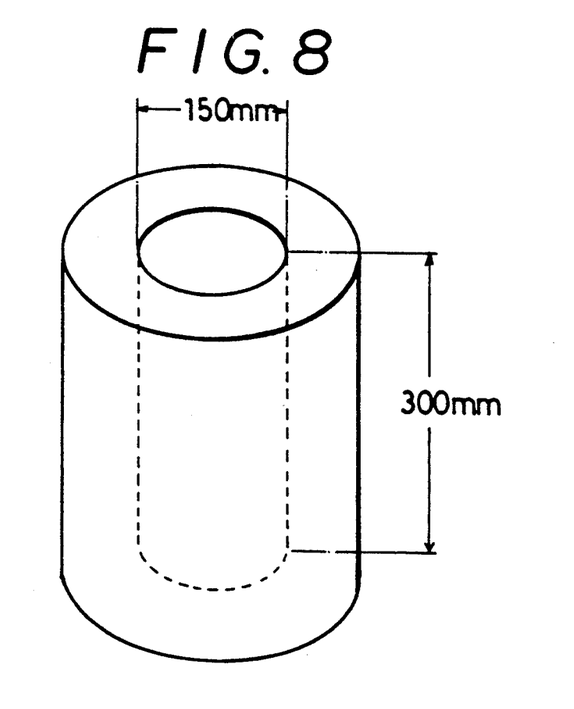
FIG. 8 is an illustration of the shape of a mould in which a cylinder liner is made of the ceramics according to the present invention.

Silicon nitride powder (mean particle diameter: ca. 1.0 μm), silicon carbide whisker (diameter: ca. 1 μm, length: ca. 20 μm) and a sintering aid were prepared in a weight ratio of 75:10:15, water and a dispersive medium were added thereto, and then the preparation was dispersed and mixed for ca. 50 hours, thereby obtaining a slip with a viscosity of ca. 0.5 poise. This slip was poured into the gypsum mould of 150 mm in diameter and 300 mm in height shown in FIG. 8 including a mould surface, a solid layer of ca. 10 mm in thickness was built up on the mould surface, and an unsolidified slip was removed.

The relative density of the formed cylindrical green body was 63.2%. By sintering this green body in a nitrogen atmosphere at 1700° C. for 3 hours, a ceramics article for cylinder liner was made. In this ceramics the silicon carbide whiskers were oriented in the same direction as to the inner surfaces of the cylinder liner. The properties of this cylinder liner are shown in Table 4. In Table 4 the bending strength was determined by JIS three-point bending method, the fracture toughness value by SEPB method, and the thermal shock resistance value was determined by submerged quenting method. In the abrasion test was polished mirror-like of the inner surface of the cylinder liner, then a normal-pressure sintered silicon nitride pressure-applying body was slid axially 10,000 times.

Comparative Example 1 is a cylindrical ceramics article made in the same processes as the cylinder liner of the above described example except that silicon nitride powder and a sintering aid were prepared in a weight ratio of 90:10 without using silicon carbide whiskers.

Comparative Example 2 is a cylindrical ceramics article whose raw materials were prepared in the same ratio as in cylinder of the above described example and which was made in the same processes as in the example except that a slip with a viscosity of 3.5 poise was made and this slip was used. In Comparative Example 2 the green body had a relative density of 54%, and the whiskers in the matrix were oriented at random.

As seen in Table 4, the cylinder liner according to the present invention has a high relative density as a sinter, and is also excellent in strength, fracture toughness value and thermal shock resistance value. According to the result of the abrasion test, the abrasion loss of a piston is small, and thus this example has excellent properties as a cylinder liner.

Comparative Example 1 exhibits low bending strength and fracture toughness value as a sinter, and is also inferior in thermal shock resistance value because it contains no whiskers. Accordingly, Comparative Example 1 is unsuitable for a cylinder liner.

Comparative Example 2 has a low relative density as a sinter, and is also insufficient in bending strength and fracture toughness value, although it contains whiskers. In Comparative Example 2 the whiskers were oriented at random, so that the abrasion loss of the piston in the abrasion test was large.

TABLE 4

| | Sintered body | | | | |
|---|---|---|---|---|---|
| | Relative density (%) | Bending strength (kg/mm²) | Fracture toughness value MPa.m^½ | Thermal shock resistance value (°C.) | Abrasion test * |
| Cylinder liner of the present invention | 98 | 93 | 6.3 | 950 | ⊕ |
| Comparative example (1) | 99 | 81 | 5.5 | 800 | x |
| Comparative example (2) | 94 | 65 | 4.8 | 850 | x |

* ⊕: Little abrasion
x: Much abrasion

EXAMPLE 6

Figure 9:
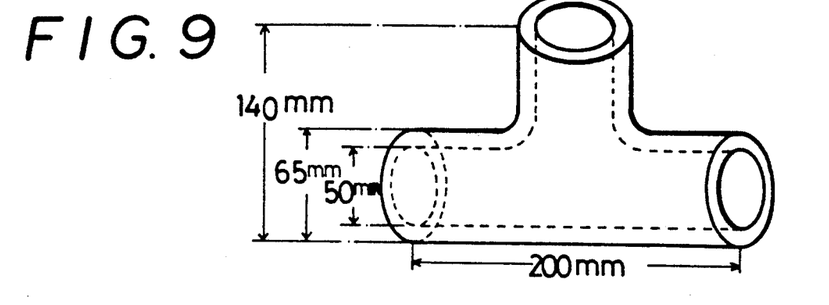
FIG. 9 is an illustration of the shape of a three-way pipe coupling.
Figure 10A:
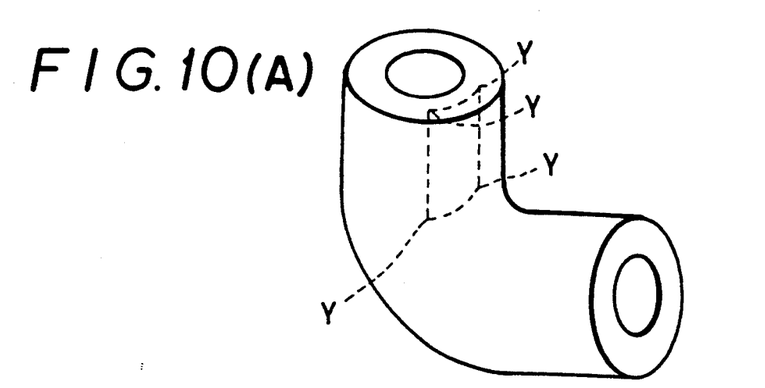
FIGS. 10(A), (B) and (C) are illustrations of the orientation of whiskers in a pipe coupling made of a ceramics article according to the present invention, wherein (A) is an illustration of a two-way coupling, (B) is a longitudinal sectional view of (A), and (C) is a scheme of the developed and enlarged plane Y—Y in (A).
Figure 10B:
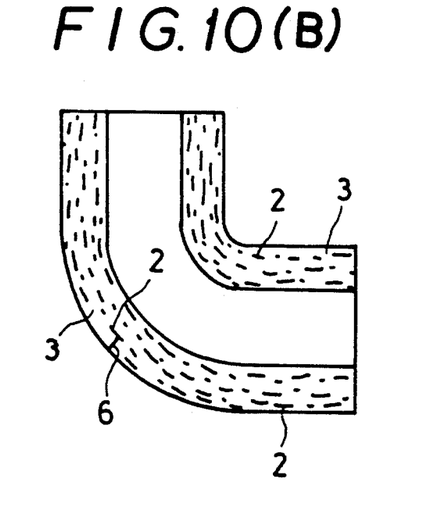
Figure 10C:
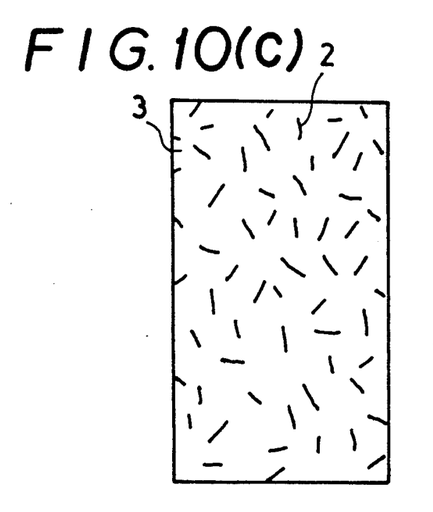

In Table 5 No. 1 is a conventional example and was formed from a slip comprising silicon nitride and a sintering aid. It is a three-way coupling whose dimensions are shown in FIG. 9. No. 2 is an example according to the present invention and is a three-way coupling of the same dimensions formed from a slip comprising silicon nitride, a sintering aid and 10% of silicon carbide whiskers. No. 1 and No. 2 were sintered at 1750° C. for 4 hours respectively. These three-way couplings were put in a reversed T form as shown in FIG. 9 and tested by pouring molten Al (750° C., 5 kg) repeatedly from above. In this test the three-way couplings were not preheated, and when they have cooled down completely to room temperature after the previous pouring, the next pouring was performed.

In this test, since the inner surfaces of a three-way coupling was heated rapidly, No. 1, a conventional three-way coupling, was broken after 35 times of pourings. However, No. 2, a three-way coupling according to the present invention, could withstand thermal shocks, and no damage were found even after 100 times of pourings.

TABLE 5

| | Silicon Nitride (%) | Sintering Aid (%) | SiC Whisker (%) | Relative density of sintered body (%) | Test Result |
|---|---|---|---|---|---|
| No. 1 | 85 | 15 | 0 | 99.1 | Broken after 35 times |
| No. 2 | 75 | 15 | 10 | 98.5 | No damage after 100 times |

EXAMPLE 7

In Table 6 No. 1 is a stoke whose green body was formed from a slip comprising only silicon nitride. It is dense, but exhibits a low shock resistance.

Although No. 2 is a stoke whose green body was formed from a slip containing 15% of silicon carbide whiskers, since a slip with a viscosity of 10 poise was used, the silicon carbide whiskers were oriented at random. But this stoke has a low relative density and is also insufficient in shock resistance.

In No. 3, a stoke according to the present invention, using a slip with a viscosity of 1.2 poise and containing 15% of whiskers, the silicon carbide whiskers were dispersed and oriented in an inclined angle of 30° and below to the inner and outer surfaces of the stoke over the whole thickness from the inner surfaces to the outer surface of the stoke, and no damage were produced. This stoke has a high relative density and is also excellent in shock resistance.

TABLE 6

| No. | Dispersed condition of whiskers | Relative density of stoke | Fracture toughness value *1 | Thermal shock reisstance temp. difference *2 |
|---|---|---|---|---|
| 1 | No whiskers | 98% | 5.4 | 700° C. |
| 2 | Three-dimensional random | 82% | 5.0 | 750° C. |
| 3 | Present invention | 95% | 6.6 | 950° C. |

*1: Fracture toughness value was measured by SEPB method, MPam$^{\frac{1}{2}}$
*2: Thermal shock resistance temperature difference was measured by submerged quenching method.

EXAMPLE 8

Figure 11:
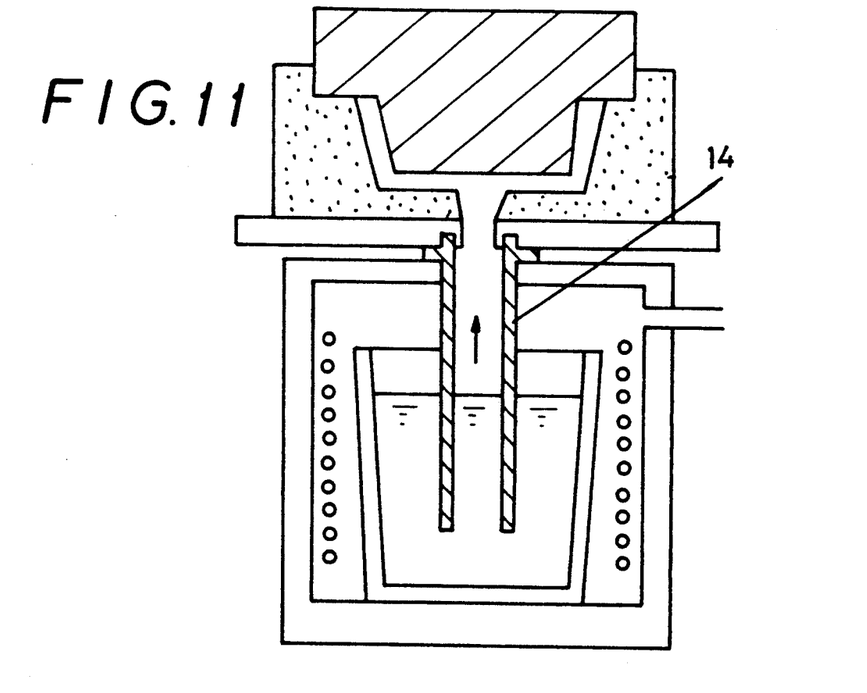
FIG. 11 is an illustration of an example of low pressure casting apparatus using a stoke made of a ceramics article according to the present invention.

In Table 7 No. 1 is a stoke (shown in FIG. 11) with the number 14 whose green body was formed from a slip comprising only silicon nitride and was sintered under a normal pressure. It has low yields of ca. 50% both in forming and sintering, and its lifetime is also short.

Although No. 2 is a stokes whose green body was formed from a slip containing 15% of SiC whiskers, it has a lower yield than No. 1. Since a slip with a viscosity of 10 poise was used, the SiC whiskers are oriented three-dimensionally at random, and the green body has low relative density and strength, and the stoke showed much shorter lifetime.

No. 3 is a stoke formed from a slip containing 15% of SiC whiskers, but having a viscosity of 5 poise. Most of the SiC whiskers were oriented parallel to the outer surfaces, but a partly disturbed orientation was observed particularly at the flange part of the stokes. This stokes had a higher yield and a longer lifetime than No. 1.

No. 4 is a stoke according to the present invention containing 15% of whiskers, however, even at the flange part from the inner surface to the outer surface of the stoke, the SiC whiskers were dispersed and oriented parallel to the wall surfaces of the stoke, that is, in an inclined angle of 30° and below to the inner and outer surfaces of the stoke as well as to the flange surfaces over the whole thickness. This stoke has remarkably improved yields in forming and sintering, and its lifetime is also much longer.

TABLE 7

| No. | Whisker | Viscosity of slip | Relative density of sintered body | Forming yield | Sintering yield | Lifetime |
|---|---|---|---|---|---|---|
| 1 | No whiskers | — | 98% | 50% | 50% | 2 Months |
| 2 | Three-dimensional random | 10 poise | 82% | 30% | 40% | 0.5 Month |
| 3 | Parallel to outer surface partly disturbed orientation | 5 poise | 89% | 80% | 90% | 5 Months |
| 4 | Parallel to outer surface | 2 poise | 95% | 95% | 95% | 10 Months |

EXAMPLE 9

In Table 8 No. 1 is a heater tube whose green body was formed from a slip comprising only silicon nitride. It is dense, but have a low shock resistance. Although No. 2 is a heater tube whose green body was formed from a slip containing 15% of silicon carbide whiskers, since a slip with a viscosity of 10 poise was used, the silicon carbide whiskers were oriented at random. This heater tube has a low relative density and is also insufficient in shock resistance.

No. 3 is a heater tube according to the present invention, using a slip with a viscosity of 1.2 poise and containing 15% of whiskers, and the silicon carbide whiskers were dispersed and oriented parallel to the wall surfaces of the heater tube, that is, in an inclined angle of 30° and below to the inner and outer surfaces of the tube over the whole thickness from the inner surface to the outer surface of the tube, and no macro defects were produced. This heater tube has a high relative density and is also excellent in shock resistance.

TABLE 8

| No. | Dispersed condition of whiskers | Relative density of heater tube | Fracture toughness value *1 | Thermal shock resistance temperature difference *2 |
|---|---|---|---|---|
| 1 | No whiskers | 98% | 5.4 | 700° C. |
| 2 | Three-dimensional random | 82% | 5.0 | 750° C. |
| 3 | Present invention | 95% | 6.6 | 950° C. |

*1 Fracture toughness value was measured by SEPB method.
*2 Thermal shock resistance temperature difference was measured by submerged quenching method.

EXAMPLE 10

Figure 12:
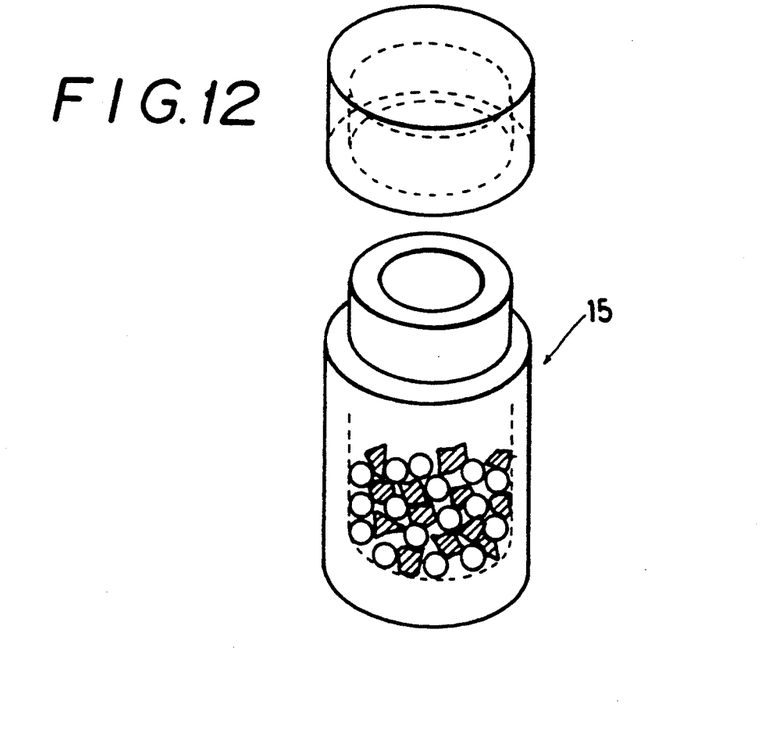
FIG. 12 is an illustration of an example of pot mills used for making high quality powder for ceramics.

Pots 15 of No. 1~No. 4 shown in Table 9 were made (shown in FIG. 12). Each pot has an inner diameter of 70 mm and a cylindrical part height of 110 mm. High-strength silicon nitride balls 16 (diameter: 10 mm) were put into each pot, and the pots were rotated at 100 rpm for 500 hours. Subsequently, the weight of a pot after use was subtracted from the weight thereof before use, which results are shown as abrasion loss in Table 9.

In Table 9 No. 1 is a pot according to the present invention wherein silicon carbide whiskers are dispersed in silicon nitride, and since a slip with a viscosity of 3.0 poise and below was used, the whiskers were dispersed and oriented parallel to the inner surface of the pot as well as two-dimensionally at random. This pot had a sintering density of 96% and was also dense. As seen in the column "abrasion loss" of Table 9, this pot was remarkably superior in abrasion resistance to Comparative Examples No. 2~No. 4.

In Table 9 No. 2 is a pot wherein silicon carbide whiskers are dispersed in silicon nitride, however, since a slip with a high viscosity was used, the whiskers were oriented three-dimensionally at random, and this pot has a low sintering density, which results in a larger abrasion loss of No. 2 than No. 1.

In Table 9 No. 3 is a conventional silicon nitride-group pot, and its abrasion loss is larger than No. 1.

In Table 9 No. 4 is a conventional alumina-group pot, and its abrasion loss is also larger than No. 1. As described above, pot No. 1 according to the present invention was extremely excellent in abrasion resistance.

TABLE 9

| | Composition (wt. %) | | | | Viscosity of slip (poise) | Relative density of sintered body (%) | Abrasion loss (g) |
|---|---|---|---|---|---|---|---|
| No. | Si$_3$N$_4$ | SiC | Al$_2$O$_3$ | Aid | | | |
| 1 | 75 | 10 | — | 15*1 | 1.2 | 96 | 0.6 |
| 2 | 75 | 10 | — | 15*1 | 10.0 | 82 | 2.6 |
| 3 | 85 | — | — | 15*1 | 1.5 | 98 | 1.3 |
| 4 | — | — | 90 | 10*2 | 1.5 | 97 | 6.4 |

*1Cordierite-group sintering aid
*2SiO$_2$-group aid

EXAMPLE 11

The same pots before use as No. 1, No. 3 and No. 4 of Table 9 were divided longitudinally into two halves respectively, and the inner surfaces of the pots were examined for the abrasion resistance and shock resistance thereof. In Table 10 No. 11 is a pot according to the present invention and corresponds to No. 1 of Table 9. No. 13 is a conventional pot wherein no whiskers are dispersed, corresponding to No. 3 of Table 9. No. 14 is an example of alumina-group pots, corresponding to No. 4 of Table 9. In Table 10 the abrasion resistance was determined by a pin-on-disk method wherein a silicon nitride pin was moved axially of the pot, and relative values are shown for 100 of an alumina test piece. In Table 10 the shock resistance values were obtained by an measuring method wherein alumina-group balls with a diameter of 25 mm were dropped.

As seen in Table 10, No. 11 according to the present invention was extremely excellent both in abrasion resistance and shock resistance compared to No. 13 and No. 14.

TABLE 10

| | Composition (wt. %) | | | | Viscosity of slip (poise) | Relative density of sintered body (%) | Abrasion resistance (%) | Shock resistance |
|---|---|---|---|---|---|---|---|---|
| No. | Si$_3$N$_4$ | SiC | Al$_2$O$_3$ | Aid | | | | |
| 11 | 75 | 10 | — | 15*1 | 1.2 | 96 | 30 | No damage observed after 1,000 times |
| 13 | 85 | — | — | 15*1 | 1.5 | 98 | 70 | Small-chips produced after 480 times |
| 14 | — | — | 90 | 10*2 | 1.5 | 97 | 100 | Small-chips produced after 30 times |

*1Cordierite-group aid
*2SiO$_2$-group aid

According to the present invention ceramics articles of high strength and superior toughness can be produced. Since these ceramics articles of high strength and superior toughness are produced by forming and sintering under normal pressure without using hot press method or HIP-method. Forming and sintering under normal pressure, it is possible to produce these ceramics with simple facilities cheaply and also of complicated shapes.

What is claimed is:

1. A method of making a ceramics composite article having dispersed whiskers oriented parallel to an outer surface of the ceramics article and in two-dimensionally random directions, comprising the steps of:
   (a) preparing a slip with a viscosity of up to 3 poise wherein said slip comprises 5-30% by volume whiskers and a ceramics powder in a dispersion medium;

(b) pouring said slip into a mold to form a ceramics green body;
(c) allowing said whiskers to orient parallel to an outer surface of said ceramics green body and in two-dimensionally random directions over a whole thickness of the ceramics green body from the outer surface to an inner surface thereof;
(d) drying said green body to obtain a green body with a density of at least 60%; and
(e) sintering said green body in a non-oxidizing atmosphere under a pressure of 10 kg/cm$^2$ or less to obtain said ceramics composite article, without hot pressing the sintered green body.

2. The method for producing a ceramics composite article as in claim 1, wherein the ceramics powder is silicon nitride.

3. The method for producing a ceramics composite article as in claim 1, wherein the ceramics powder is silicon nitride and said whiskers are silicon carbide whiskers.

4. A method of making a ceramics composite article having dispersed platelets oriented parallel to an outer surface of the ceramics article and in two-dimensionally random directions, comprising the steps of:

(a) preparing a slip with a viscosity of up to 5 poise wherein said slip comprises up to 30% by volume platelets and a ceramics powder in a dispersion medium;
(b) pouring said slip into a mold to form a ceramics green body;
(c) allowing said platelets to orient parallel to an outer surface of said ceramics green body and in two-dimensionally random directions over a whole thickness of the ceramics green body from the outer surface to an inner surface thereof;
(d) drying said green body to obtain a green body with a density of at least 60%; and
(e) sintering said green body in a non-oxidizing atmosphere under a pressure of 10 kg/cm$^2$ or less to obtain said ceramics composite article, without hot pressing the sintered green body.

5. The method of making a ceramics composite article of claim 4, wherein the ceramics powder is silicon nitride powder.

6. The method of making a ceramics composite article of claim 4, wherein said platelets are silicon carbide or boron nitride and the ceramics powder is silicon nitride powder.

* * * * *